United States Patent
Burns et al.

(10) Patent No.: US 8,489,146 B2
(45) Date of Patent: Jul. 16, 2013

(54) USER INTERFACE FOR OPTIMIZED VIEWING OF HEADER INFORMATION

(75) Inventors: Anthony G. Burns, Burlington (CA); Ronald L. Roth, New Hamburg (CA)

(73) Assignee: Research In Motion Limited, Waterloo (CA)

( * ) Notice: Subject to any disclaimer, the term of this patent is extended or adjusted under 35 U.S.C. 154(b) by 2040 days.

(21) Appl. No.: 10/079,169

(22) Filed: Feb. 20, 2002

(65) Prior Publication Data

US 2002/0126146 A1 Sep. 12, 2002

Related U.S. Application Data

(60) Provisional application No. 60/269,810, filed on Feb. 20, 2001.

(51) Int. Cl.
*H04M 1/00* (2006.01)

(52) U.S. Cl.
USPC ............... 455/566; 455/550.1; 455/158.4; 345/581; 345/619

(58) Field of Classification Search
USPC ..... 455/550.1, 566, 158.4; 709/206; 345/418, 345/700, 841, 581, 619
See application file for complete search history.

(56) References Cited

U.S. PATENT DOCUMENTS

| | | | | |
|---|---|---|---|---|
| 5,732,384 | A | * | 3/1998 | Ellert et al. ................... 701/120 |
| 5,835,084 | A | * | 11/1998 | Bailey et al. .................. 715/783 |
| 5,890,163 | A | * | 3/1999 | Todd ............................. 707/200 |
| 6,008,810 | A | * | 12/1999 | Bertram et al. ............... 715/809 |
| 6,181,344 | B1 | | 1/2001 | Tarpenning et al. |
| 6,288,718 | B1 | * | 9/2001 | Laursen et al. ............... 715/800 |
| 6,418,307 | B1 | * | 7/2002 | Amin ............................ 455/413 |
| 6,493,324 | B1 | * | 12/2002 | Truetken ....................... 370/261 |
| 6,560,638 | B1 | * | 5/2003 | Haneda et al. ............... 709/206 |
| 6,593,949 | B1 | * | 7/2003 | Chew et al. .................. 345/841 |
| 6,694,376 | B1 | * | 2/2004 | Ohara .......................... 709/250 |
| 6,697,458 | B1 | * | 2/2004 | Kunjibettu ................ 379/88.17 |
| 6,772,143 | B2 | * | 8/2004 | Hung ............................... 707/3 |

FOREIGN PATENT DOCUMENTS

WO WO 99/16181 4/1999

\* cited by examiner

*Primary Examiner* — Nghi H Ly
(74) *Attorney, Agent, or Firm* — Jones Day

(57) ABSTRACT

A graphical user interface is used to display information on small screens that would otherwise be incomplete. The interface consists of a dialog box that appears over the existing screen, displaying the full information required, when a user makes an input to view the information.

17 Claims, 5 Drawing Sheets

```
Folder: Procedures
Message Status: Read
To: Karen Moser (Email)
Sent: Jan 8, 2001 8:45a
From: Tanya Busch (Email)      ←——— 30
Subject: RE: Question
_____
Thx -----Original Message-----
From: Karen Moser
Sent: Monday, January 08, 2001
8:44 AM
To: Tanya Busch
Subject: Re: Question
```

FIG. 4A

```
Folder: Procedures                T
Message Status: Read
To: Karen Moser (Email)
Sent: Jan 8, 2001 8:45a                    32
From: tbusch@rim.net   ←———
Subject: RE: Question
_____
Thx -----Original Message-----
From: Karen Moser
Sent: Monday, January 08, 2001
8:44 AM
To: Tanya Busch
Subject: Re: Question
```

FIG. 4B

USER INTERFACE FOR OPTIMIZED VIEWING OF HEADER INFORMATION

CROSS-REFERENCE TO RELATED APPLICATION

This application claims priority from and is related to the following prior application: USER INTERFACE FOR OPTIMIZED VIEWING OF HEADER INFORMATION, U.S. Provisional Patent Application No. 60/269,810, filed Feb. 20, 2001. This prior application, including the entire written description and drawing figures, is hereby incorporated into the present application by reference.

BACKGROUND OF THE INVENTION

1. Field of the Invention

This invention relates to the user interface mobile communication devices. Specifically this invention relates to optimising the screen space available to provide sufficient viewing of information that would otherwise be obscured or truncated.

2. Description of the Prior Art

In most handheld mobile communication devices (herein referred to as mobile devices), the display screen (also herein referred to as screen) is very small in order to reduce the overall size of the mobile device. Message lists contain lengthy information that takes up display screen real estate. Typically, the message list will contain information regarding the time received, the sender's name or address, and the subject of the message. This information is usually contained on a single line. If the sender's name or the subject text is especially long, the text will be cut off in order to fit the field length. Often this modification will not allow the user enough information to know who the sender is or what the subject is. It is desirable to view the message information within the message list without opening the message when searching quickly for a message.

The header information within a message may also be limited in order to save screen real estate. Typically a message will show the sender's name in the sender field as the "friendly address". This is the user name of the sender or the name that is listed in the address book of the mobile communication device. The qualified address or e-mail address of the sender may not be listed in the header information to save screen space. It is desirable to view the qualified address as well as the friendly address of the sender.

SUMMARY OF THE INVENTION

It is an object of the invention to provide a method of viewing message information in restricted text fields on a limited screen in mobile devices.

In the one aspect of the invention, a graphical user interface for a mobile communication device comprises a first state having a display screen on the mobile communication device with a plurality of graphical elements thereon and a second state comprising a display screen having a plurality of graphical elements thereon and a dialog box to display information unavailable to the user brought forward over the graphical elements upon user input. The dialog box may include, but is not limited to, such information as the sender name, the subject text, message length, the time and date sent, and attachments.

Another embodiment of the invention would be to allow the user to determine the information that will appear in the information dialog box.

A supplementary aspect of the invention is a user interface method to view incomplete information such that the information to view is selected, an input is made to view the information, and then the information is displayed A further embodiment of the invention is to be able to toggle between the sender's name and qualified address in the message headers when viewing a message on the mobile device.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which:

FIG. 4A is a drawing of typical mobile device screens showing the message header information;

FIG. 4B is a drawing of the message header information showing the sender field showing the qualified address of the sender;

DETAILED DESCRIPTION OF THE PREFERRED EMBODIMENT

Figure 1A:
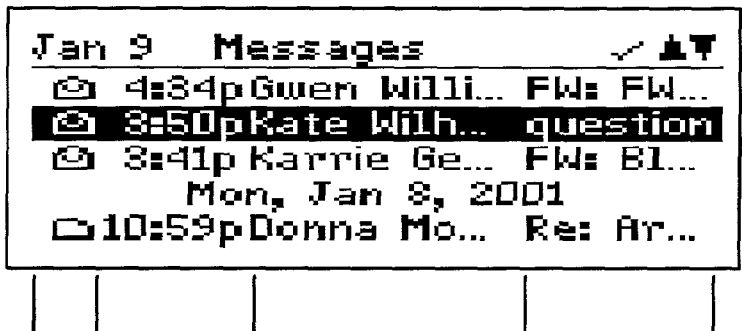
FIGS. 1A and B are drawings of typical mobile device screens showing the message list information.
Figure 1B:
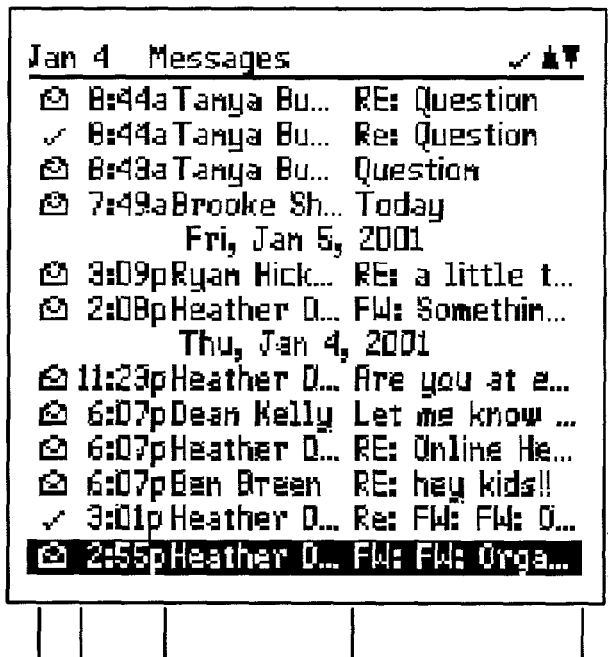

Referring to the diagrams, FIG. 1A and FIG. 1B depict typical mobile device screens. Generally, each row of a message summary listing on a mobile device may comprise, but is not limited to, such information as the message status icon 2, the time the message is received 4, the name of the person from whom the message is sent 6 (alternatively, the email address of the person may appear), and the subject of the message 8. In this embodiment of the message list, each message is limited to a single line of text (a row). Because of the limits of screen width and the size of the font used in mobile devices, often the fields for the sender name 6 and message subject 8 must be restricted. In the cases where the text is especially long, the text will be cut off (truncated) in order to fit the displayed field. FIGS. 1A and B show that several names in the sender name field 6 have been modified (truncated) to fit the field. Hence, the fields may have a specific length of characters displayed. This is also true for the subject text in the subject field 8. Often this modification will not allow the user enough information to know who the sender is or what the message is about. It is be understood that the plurality of messages may include e-mail messages, voice mail summaries, calendar events/appointments, fax summaries, etc.

In a preferred embodiment of the invention, if the user wants to view information about a particular message without opening the message, the user will first highlight the message 10. When an input from the user is initiated, a dialog box 12 will appear over the message list screen with the message information. A preferred embodiment of the invention will have the user input is made from a keypad on the mobile device. Alternatively, an input from a thumbwheel or jog dial may be provided. The information provided in the dialog box may include but is not limited to the sender name, the message subject, the time the message was received, the length of the message, and message attachments. In this embodiment of the invention, the information dialog box will contain the sender name, and the subject text.

Figure 2A:
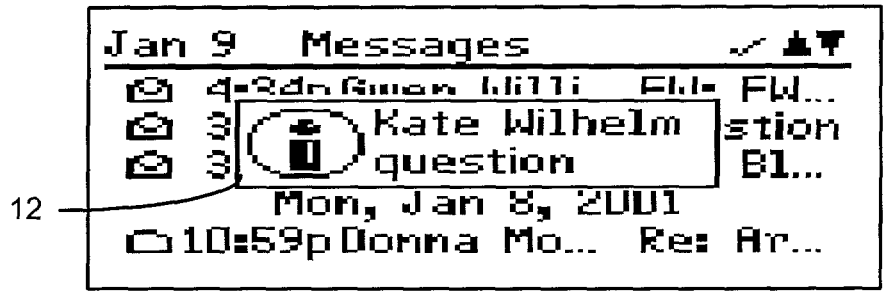
FIGS. 2A and B are drawings of the information dialog box in the message screen.
Figure 2B:
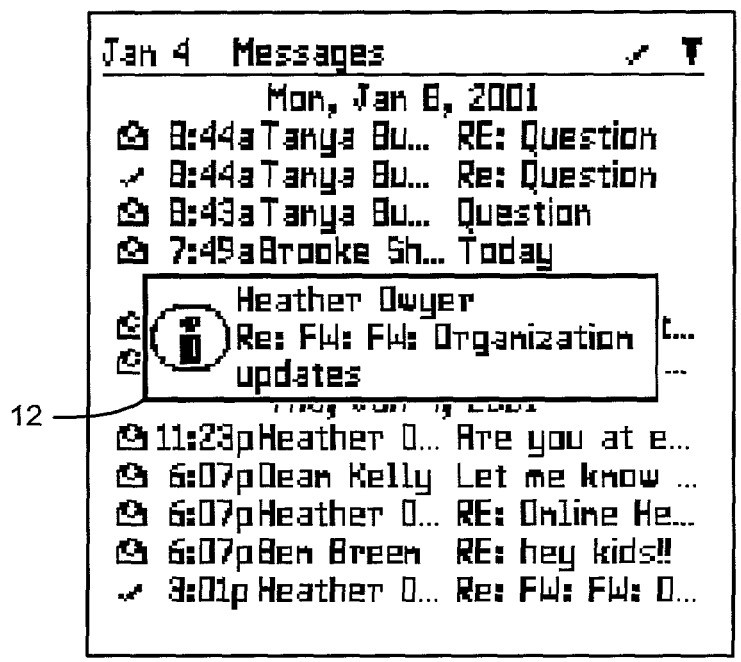

FIG. 2A and FIG. 2B show the information dialog box 12 for the highlighted message in FIGS. 1A and 1B respectively. The information dialog box 12 will scale in size according to the size of the text for the sender name and subject text. The original message line may remain highlighted in behind the dialog box in order to allow the user to know the message location.

Referring now to an alternative embodiment of the invention, once the information dialog box has been opened a user may be able to scroll through the message list and have the information change as the user scrolls down. As a user moves down the message list with an input such as a thumbwheel, the information in the dialog box will change according to the information in the message headers of a highlighted message.

Figure 3:
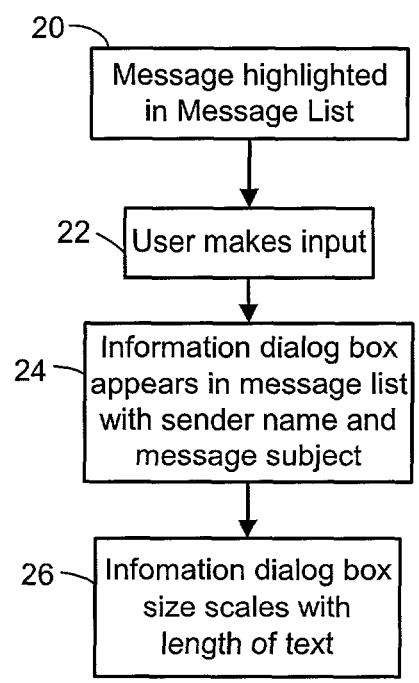
FIG. 3 is a flow diagram setting forth the method used in order to view incomplete information in the message screen.

FIG. 3 is a flow diagram depicting the steps carried out in order to view incomplete information in the message list. In step 20, the user will select the information that the user wishes to view. In a preferred embodiment of the invention, the user will select this information by moving the highlight or cursor over the message the user desires in the message list. In step 22, the user will enter an input to the mobile device. In the preferred embodiment of the invention, the input will be made from a key entry on the keypad of the mobile device. A dialog box will appear over the message list, in step 24. This dialog box will take the partial information from the message list and display the full text. In this embodiment of the invention, the information will include the sender name and the message subject.

A further embodiment of the invention is now referenced in FIGS. 4A and 4B. FIG. 4A depicts a typical mobile device screen displaying a message. The message headers are shown. The sender address is a "friendly address" meaning the sender's user identification or how the sender is listed in the user's address book. The friendly address in FIG. 4A as the "From:" address 30. By making a predetermined input, the user can toggle between the sender's friendly address and their qualified address or e-mail address. The input can be made through several methods including a keypad stroke or by a thumbwheel. FIG. 4B shows the message headers once the input has been made. The sender's name is now displayed as an e-mail address in the "From:" field 32.

Figure 5:
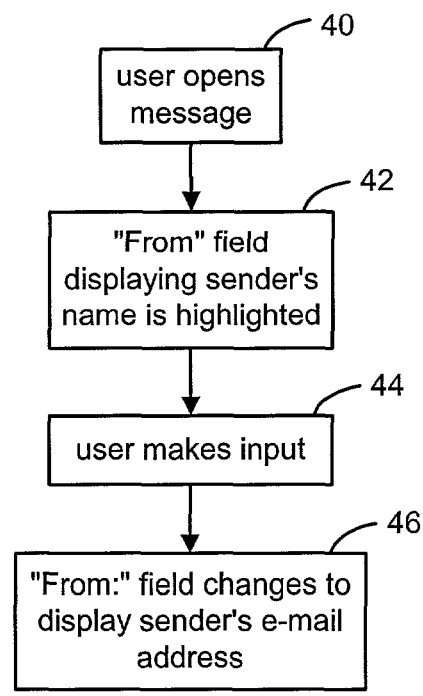
FIG. 5 is a flow diagram setting forth the method used in order to change the sender information from the sender name to the sender's e-mail address.

FIG. 5 is a flow chart setting forth the method for toggling between a sender friendly address and qualified address. In step 40, a user opens a message in the message list of the mobile device. In step 42, the user will select the header information for the sender or the "From:" field. In a preferred embodiment of the invention, the user will select this information by moving the highlight or cursor over the field. In step 44 the user enters an input to the mobile device. In a preferred embodiment of the invention, the input will be made from a key entry on the keypad of the mobile device. Once the input is made, the mobile device will change the "From:" field to show the sender's e-mail address or qualified address in step 46.

In one embodiment of the invention, there is provided a graphical user interface (GUI) for a user of a handheld communication device comprising a first display state comprising: a first GUI displayed on a screen of the handheld communication device, said first GUI having at least a plurality of e-mail message rows forming a summary listing of e-mail messages at least received by the handheld communication device, each e-mail message row comprising of an e-mail message status icon, an e-mail message receipt timing, a sender information having a first length of characters displayed and an e-mail message subject line having a second length of characters displayed, wherein a first e-mail message row of the at least a plurality of e-mail message rows is selected by a first input by the user; a second display state comprising: a second GUI displayed on the screen of the handheld communication device comprising of the first GUI further comprising of a dialog box containing information associated with the selected first e-mail message row, said information comprising of at least a sender information having a third length of characters displayed and a message subject line having a fourth length of characters displayed, wherein the dialog box partially hides from view to the user a portion of the selected first e-mail message row; and, wherein the third length of characters displayed is of equal or greater length of characters displayed than the first length of characters; wherein the fourth length of characters displayed is of equal or greater length of characters displayed than the second length of characters; wherein the second display state appears upon receiving a second input from the user. The sender information is the e-mail address of a sender. The first GUI further comprises a plurality of voice mail messages. The information of the dialog box further comprises a message body of the selected first e-mail message row.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A method in a mobile communication device having a limited-width display screen, comprising:
   receiving electronic messages at the mobile communication device;
   displaying a list on the display screen, each row of the list containing a sender field and a subject field for a respective one of the messages, the sender field and the subject field of at least one row being truncated so that not all of the text characters for the sender field and the subject field are displayed because of the limited width of the display screen;
   receiving a selection of the at least one row in which the sender field and the subject field are truncated;
   displaying, over the summary data list, a dialog box displaying all of the text characters for the sender field and the subject field for the selected message, without opening the electronic message of the selected row; and
   toggling between a first mode and a second mode, in the first mode the sender field in the dialog box contains all the text characters for an email address of the message's sender, and in the second mode the sender field in the dialog box contains all the text characters of a corresponding friendly address of the message's sender, the toggling occurring upon each receipt by the mobile communication device of a predetermined input.

2. The method of claim 1 wherein at least one of the rows includes a message status icon for the respective message.

3. The method of claim 1 wherein at least one of the rows includes one or more of a message time of receipt field, a length of the message field, or an attachments field for the respective message.

4. The method of claim 1 wherein the dialog box further displays a data field regarding the selected message that is not displayed in the list.

5. The method of claim 1 wherein the selection is made using a keypad of the mobile communication device.

6. The method of claim 1 wherein the friendly address is derived by the communication device from an electronic address book based on the email address.

7. The method of claim 1 further comprising scaling the size of the dialog box according to the number of text characters in the sender field and the subject field for the selected message while the selected row of the list remains highlighted behind the dialog box.

8. The method of claim 1 further comprising, while the dialog box is displayed over the summary data list, receiving a selection of another row of the list and, in response, displaying in the displayed dialog box all of the text characters for the sender field and the subject field for the message of the another row.

9. The method of claim 1 wherein the predetermined input is by moving a cursor over the sender field.

10. A method in a mobile communication device having a limited-width display screen, comprising:
 receiving electronic messages at the mobile communication device;
 displaying a list on the display screen, each row of the list containing a sender field and a subject field for a respective one of the messages, the sender field and the subject field of at least one row being truncated so that not all of the text characters in the sender field and the subject field are displayed because of the limited width of the display screen;
 receiving a selection of the at least one row in which the sender field and the subject field are truncated;
 displaying, over the summary data list, a dialog box displaying all of the text characters for the sender field and the subject field for the selected message, without opening the selected electronic message; and
 scaling the size of the dialog box based on the number of text characters in the sender field and the subject field in the dialog box, while the selected row of the list remains partially hidden from view by the dialog box.

11. The method of claim 10 wherein at least one of the rows includes a message status icon for the respective message.

12. The method of claim 10 wherein at least one of the rows includes one or more of a message time of receipt field, a length of the message field, or an attachments field for the respective message.

13. The method of claim 10 wherein the dialog box further displays a data field regarding the selected message that is not displayed in the list.

14. The method of claim 10 wherein the selection is made using a keypad of the mobile communication device.

15. The method of claim 10 wherein the scaling includes scaling the size of the dialog box based on the number of text characters in the sender field and the subject field in the dialog box, while the selected row of the list remains partially hidden from view by the dialog box but highlighted behind the dialog box.

16. The method of claim 10 further comprising, while the dialog box is displayed over the summary data list, receiving a selection of another row of the list and, in response, displaying in the displayed dialog box all of the text characters for the sender field and the subject field for the message of the another row.

17. The method of claim 10 wherein the predetermined input is by moving a cursor over the sender field.

* * * * *